United States Patent
Yeo et al.

(10) Patent No.: US 11,943,352 B2
(45) Date of Patent: Mar. 26, 2024

(54) OUTSOURCING EXPONENTIATION IN A PRIVATE GROUP

(71) Applicant: Google LLC, Mountain View, CA (US)

(72) Inventors: Kevin Yeo, Mountain View, CA (US); Sarvar Patel, Montville, NJ (US); Phillipp Schoppmann, Mountain View, CA (US)

(73) Assignee: Google LLC, Mountain View, CA (US)

( * ) Notice: Subject to any disclaimer, the term of this patent is extended or adjusted under 35 U.S.C. 154(b) by 407 days.

(21) Appl. No.: 17/233,045

(22) Filed: Apr. 16, 2021

(65) Prior Publication Data
US 2021/0234688 A1  Jul. 29, 2021

Related U.S. Application Data

(63) Continuation of application No. 16/411,646, filed on May 14, 2019, now Pat. No. 11,005,654.

(51) Int. Cl.
| | |
|---|---|
| *H04L 9/30* | (2006.01) |
| *G06F 7/72* | (2006.01) |
| *G06F 9/30* | (2018.01) |
| *G06F 16/9035* | (2019.01) |
| *H04L 9/08* | (2006.01) |

(52) U.S. Cl.
CPC ............ *H04L 9/3033* (2013.01); *G06F 7/723* (2013.01); *G06F 9/3001* (2013.01); *G06F 16/9035* (2019.01); *H04L 9/085* (2013.01)

(58) Field of Classification Search
CPC ....... H04L 9/085; H04L 9/3033; G06F 7/723; G06F 16/9035; G06F 9/3001
See application file for complete search history.

(56) References Cited

U.S. PATENT DOCUMENTS

| | | |
|---|---|---|
| 6,990,468 B1 | 1/2006 | Berson et al. |
| 7,016,494 B2 | 3/2006 | Hopkins et al. |
| | (Continued) | |

FOREIGN PATENT DOCUMENTS

| | | |
|---|---|---|
| CN | 109314641 A | 2/2019 |
| CN | 109740376 A | 5/2019 |
| WO | 2018122238 A1 | 7/2018 |

OTHER PUBLICATIONS

NPL Search Terms (Year: 2023).*

(Continued)

*Primary Examiner* — Syed A Zaidi
(74) *Attorney, Agent, or Firm* — Honigman LLP; Brett A. Krueger

(57) ABSTRACT

A method for outsourcing exponentiation in a private group includes executing a query instruction to retrieve a query element stored on an untrusted server by selecting a prime factorization of two or more prime numbers of a modulus associated with the query element stored on the server, obtaining a group element configured to generate a respective one of the prime numbers, generating a series of base values using the prime factorization and the group element, and transmitting the series of base values from the client device to the server. The server is configured to determine an exponentiation of the group element with an exponent stored on the server using the series of base values. The method also includes receiving a result from the server based on the exponentiation of the group element with the exponent.

20 Claims, 6 Drawing Sheets

(56) References Cited

U.S. PATENT DOCUMENTS

| | | | |
|---|---|---|---|
| 7,051,199 | B1 | 5/2006 | Berson et al. |
| 7,227,947 | B2 | 6/2007 | Seysen |
| 7,266,692 | B2 | 9/2007 | Ramzan et al. |
| 7,315,941 | B2 | 1/2008 | Ramzan et al. |
| 7,421,583 | B1 | 9/2008 | Berson et al. |
| 7,620,625 | B2 | 11/2009 | Ramzan et al. |
| 7,721,089 | B2 | 5/2010 | Gentry et al. |
| 7,730,319 | B2 | 6/2010 | Ramzan et al. |
| 7,743,252 | B2 | 6/2010 | Ramzan et al. |
| 7,747,857 | B2 | 6/2010 | Ramzan et al. |
| 7,941,422 | B2 | 5/2011 | Ramzan et al. |
| 7,987,201 | B2 | 7/2011 | Ramzan et al. |
| 8,065,332 | B2 | 11/2011 | Ramzan et al. |
| 8,132,006 | B2 | 3/2012 | Ramzan et al. |
| 8,457,309 | B2 | 6/2013 | Belenky et al. |
| 9,071,598 | B2 | 6/2015 | Ramzan et al. |
| 9,077,536 | B2 * | 7/2015 | Cheon .................... G06F 7/724 |
| 10,044,509 | B1 | 8/2018 | Kirshner |
| 2005/0190912 | A1 * | 9/2005 | Hopkins ............... H04L 9/3033 380/44 |
| 2005/0259817 | A1 | 11/2005 | Ramzan et al. |
| 2009/0190752 | A1 | 7/2009 | Ramzan et al. |
| 2009/0193000 | A1 * | 7/2009 | Ramzan .................. G06F 7/723 |
| 2015/0319159 | A1 * | 11/2015 | Abdul Hameed Khan ................. H04W 12/065 726/7 |
| 2015/0358219 | A1 * | 12/2015 | Kanda ................. H04L 41/0896 709/224 |
| 2018/0115535 | A1 | 4/2018 | Mehta |
| 2019/0045016 | A1 * | 2/2019 | Dewan .................. H04L 67/142 |
| 2020/0097575 | A1 * | 3/2020 | Mathur ............... G06F 16/2358 |
| 2021/0064986 | A1 * | 3/2021 | Xi ........................... H03M 7/26 |

OTHER PUBLICATIONS

Ma, Xu, Jin Li, and Fangguo Zhang. "Efficient and secure batch exponentiations outsourcing in cloud computing." 2012 Fourth International Conference on Intelligent Networking and Collaborative Systems. IEEE, 2012. (Year: 2012).*

Wang, Yujue, et al. "Securely outsourcing exponentiations with single untrusted program for cloud storage." Computer Security—ESORICS 2014: 19th European Symposium on Research in Computer Security, Wroclaw, Poland, Sep. 7-11, 2014. Proceedings, Part I 19. Springer International Publishing, 2014. (Year: 2014).*

Uzunkol et al. "Hide the Modulus: a secure non-interactive fully verifiable delegation scheme for modular exponentiations via CRT." International Conference on Information Security. Springer, Cham, 2018. (Year: 2018), 23 pages.

NPL Search Results (Year: 2020).

Cachin C et al: "Computationally Private Information Retrieval With Polylogarithmic Ommunication", Electronic Publishing, Artistic Imaging, and Digital Typography; [Lecture Notes in Computer Science , ISSN 0302-9743], Springer Verlag, DE, vol. 1592, Jan. 1, 1999 (Jan. 1, 1999), pp. 402-414, XP002346989, DOI: 0.1007/3-540-4891 O-X_28 Isbn: 978-3-540-24128-7.

Craig Gentry et al: "Single-Database Private Information Retrieval with Constant Communication Rate", Aug. 11, 2005 (Aug. 11, 2005), Automata, Languages and Programming; [Lecture Notes in Computer Science; ; LNCS], Springer-Verlag, Berlin/Heidelberg, pp. 803-815, XP019012683, ISBN: 978-3-540-27580-0.

Daniel J Bernstein: "Pippenger's exponentiation algorithm", Jan. 1, 2002 (Jan. 1, 2002), XP055674975, Retrieved from the Internet: URL:https://cr.yp.to/papers/pippenger. pdf [retrieved on Mar. 9, 2020].

International Search Report for the related Application No. PCT/US2019/065563 dated Dec. 10, 2019.

Indian Examination Report for the related Application No. 202147051023 dated Jun. 22, 2022, 7 pages.

Chinese Office Action for the related Application No. 201980098454.8, dated Oct. 17, 2023, 5 pages.

* cited by examiner

OUTSOURCING EXPONENTIATION IN A PRIVATE GROUP

CROSS REFERENCE TO RELATED APPLICATIONS

This U.S. patent application is a continuation of, and claims priority under 35 U.S.C. § 120 from, U.S. patent application Ser. No. 16/411,646, filed on May 14, 2019. The disclosure of this prior application is considered part of the disclosure of this application and is hereby incorporated by reference in its entirety.

TECHNICAL FIELD

This disclosure relates to outsourcing exponentiation in a private group.

BACKGROUND

Private information retrieval (PIR) schemes allow a user to retrieve data from one or more storage devices while not revealing any knowledge about the user or the retrieved data to a server hosting the one or more storage devices. For PIR, server storage devices are generally not protected and private information is retrieved from either a public storage device or a server storage device with a group of subscribers all permitted to download data from the entire storage device. While users may simply download all of the content from a server storage device so that access patterns are not revealed, this takes too long when having to download all the contents from a cloud storage service spanning multiple storage devices. Moreover, conventional PIR schemes consume either significant amounts of bandwidth or require significant computation.

SUMMARY

One aspect of the disclosure provides a method for outsourcing exponentiation in a private group. The method includes executing, at data processing hardware of a client device, a query instruction to retrieve a query element stored on an untrusted server by selecting a prime factorization of a modulus associated with the query element stored on the untrusted server. The prime factorization includes two or more prime numbers. The method also includes obtaining a group element configured to generate a respective one of the two or more prime numbers of the prime factorization and generating a series of base values using the prime factorization of the modulus and the group element. The method also includes transmitting the series of base values from the client device to the untrusted server. The untrusted server is configured to determine an exponentiation of the group element with an exponent stored on the untrusted server using the series of base values. The method also includes receiving, at the data processing hardware, a result from the untrusted server. The result is based on the exponentiation of the group element with the exponent stored on the untrusted server.

Implementations of the disclosure may include one or more of the following optional features. In some implementations, generating the series of base values includes generating a series of initial base values using the prime factorization of the modulus and the group element and reducing each initial base value in the series of initial base values by the modulus to generate a series of modulus-reduced base values. Each modulus-reduced base values includes a respective initial base value in the series of initial base values reduced by the modulus. Transmitting the series of base values to the untrusted server, in some examples, includes transmitting the series of modulus-reduced base values to the untrusted server. The untrusted server is configured to determine the exponentiation of the group element with the exponent stored on the untrusted server using the series of modulus-reduced base values.

In some implementations, transmitting the series of base values to the untrusted server further includes transmitting the modulus to the untrusted server. The untrusted server may be configured to determine the exponentiation of the group element with the exponent stored on the untrusted server using the series of base values. The untrusted server may also be configured to generate the result by reducing the exponentiation of the group element with the exponent by the modulus and transmit the result to the client device. In some examples, the method further includes, when the result includes the exponentiation of the group element with the exponent, reducing, by the data processing hardware, the result by the modulus.

Optionally, generating the series of base values includes obtaining a numeral position system representing the exponent stored on the untrusted server and generating each base value in the series of base values based on an exponentiation of the group element by a respective base element corresponding to a digit position in the numeral position system. The numeral position system representing the exponent stored on the untrusted server is, in some examples, selected by the client device or the untrusted server based on a bandwidth limit for communications between the client device and the untrusted server. The numeral position system may include one of binary, hexadecimal, or decimal.

Obtaining the numeral position system representing the exponent stored on the untrusted server further includes, in some implementations, obtaining a number of digits for the exponent represented by the numeral position system. The number of digits for the exponent is equal to a number of base values in the series of base values generated by the executed query instruction. The untrusted server may be configured to determine the exponentiation of the group element with the exponent stored on the untrusted server by, for each base value in the series of base values received from the client device, determining an exponentiation of the base value with a value at a respective digit position of the exponent and multiplying the exponentiations of the base values with the values at the respective digit positions of the exponent together. The result may be associated with the queried element and the client device may, in some examples, never reveal the prime factorization of the modulus to the untrusted server.

Another aspect of the disclosure provides a system for outsourcing exponentiation in a private group. The system includes data processing hardware of a client device and memory hardware in communication with the data processing hardware. The memory hardware stores instructions that when executed on the data processing hardware cause the data processing hardware to perform operations. The operations include executing a query instruction to retrieve a query element stored on an untrusted server by selecting a prime factorization of a modulus associated with the query element stored on the untrusted server. The prime factorization includes two or more prime numbers. The operations also include obtaining a group element configured to generate a respective one of the two or more prime numbers of the prime factorization and generating a series of base values using the prime factorization of the modulus and the group element. The operations also include transmitting the series of base values from the client device to the untrusted server. The untrusted server is configured to determine an exponentiation of the group element with an exponent stored on the untrusted server using the series of base values. The operations also include receiving a result from the untrusted server. The result is based on the exponentiation of the group element with the exponent stored on the untrusted server.

This aspect may include one or more of the following optional features. In some implementations, generating the series of base values includes generating a series of initial base values using the prime factorization of the modulus and the group element and reducing each initial base value in the series of initial base values by the modulus to generate a series of modulus-reduced base values. Each modulus-reduced base values includes a respective initial base value in the series of initial base values reduced by the modulus. Transmitting the series of base values to the untrusted server, in some examples, includes transmitting the series of modulus-reduced base values to the untrusted server. The untrusted server is configured to determine the exponentiation of the group element with the exponent stored on the untrusted server using the series of modulus-reduced base values.

In some implementations, transmitting the series of base values to the untrusted server further includes transmitting the modulus to the untrusted server. The untrusted server may be configured to determine the exponentiation of the group element with the exponent stored on the untrusted server using the series of base values. The untrusted server may also be configured to generate the result by reducing the exponentiation of the group element with the exponent by the modulus and transmit the result to the client device. In some examples, the operations further include, when the result includes the exponentiation of the group element with the exponent, reducing the result by the modulus.

Optionally, generating the series of base values includes obtaining a numeral position system representing the exponent stored on the untrusted server and generating each base value in the series of base values based on an exponentiation of the group element by a respective base element corresponding to a digit position in the numeral position system. The numeral position system representing the exponent stored on the untrusted server is, in some examples, selected by the client device or the untrusted server based on a bandwidth limit for communications between the client device and the untrusted server. The numeral position system may include one of binary, hexadecimal, or decimal.

Obtaining the numeral position system representing the exponent stored on the untrusted server further includes, in some implementations, obtaining a number of digits for the exponent represented by the numeral position system. The number of digits for the exponent is equal to a number of base values in the series of base values generated by the executed query instruction. The untrusted server may be configured to determine the exponentiation of the group element with the exponent stored on the untrusted server by, for each base value in the series of base values received from the client device, determining an exponentiation of the base value with a value at a respective digit position of the exponent and multiplying the exponentiations of the base values with the values at the respective digit positions of the exponent together. The result may be associated with the queried element and the client device may, in some examples, never reveal the prime factorization of the modulus to the untrusted server.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
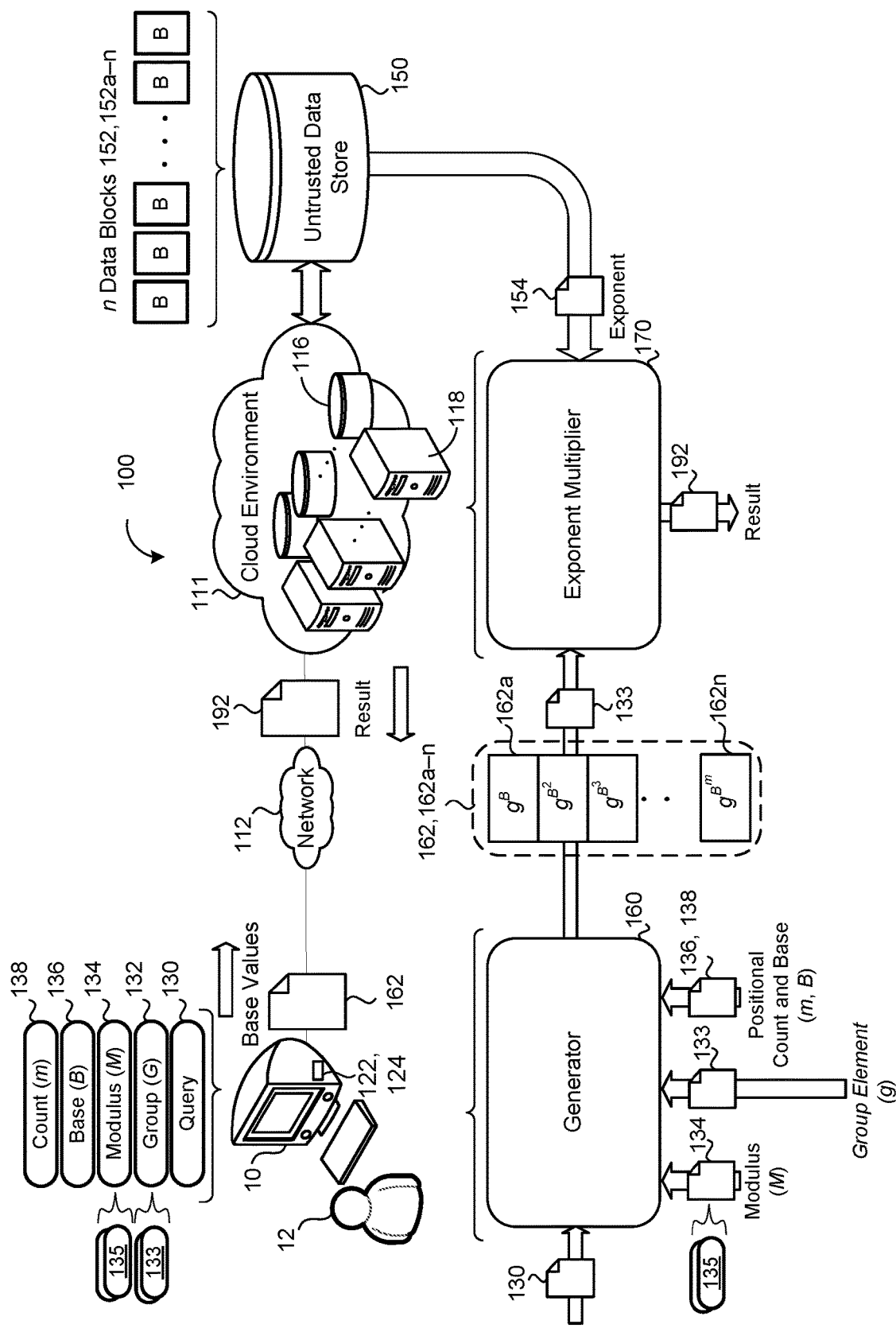
FIG. 1 is a schematic view of an example private information retrieval system that outsources exponentiation when obliviously accessing data blocks stored on non-transitory data storage of a distributed system.

Exponentiation is a common mathematical operation between a base and an exponent, where the exponentiation corresponds to repeated multiplications of the base. Exponentiation is used extensively in many fields, such as biology, physics, and computer science. However, the computation of extremely large exponents is difficult due to the super-linear nature of exponentiation. That is, as the exponent grows, the raw computational difficulty increases at a rate faster than linear. However, there are methods to reduce the difficulty of calculating the results of large exponentiations. For example, the so called "power rule of exponents" significantly reduces computation when factors of the exponent are known.

However, integer factorization is also a known difficult problem. In fact, with sufficiently large integers, there are no efficient, known means for factoring. This difficult problem forms the foundation of much of modern cryptography. For example, two large primes may be kept secret (e.g., a private key), while the multiplication of the two large primes together may be shared (e.g., a public key) without revealing the secret primes.

Exponentiation and prime factorization can also play an important role in private information retrieval (PIR) schemes. PIR schemes allow a user to retrieve data from one or more storage devices while not revealing any knowledge about the user or the retrieved data to a server hosting the one or more storage devices. For example, a server may store a public database of n blocks $B_1, \ldots, B_n$ of equal length. The user wishes to download a block B. For privacy reasons, the user does not want to reveal to the server (or anyone else) the index of the downloaded data block. That is, the user desires to obliviously retrieve the selected data block. One solution for this problem is to have the client download the entire database. While effective, the bandwidth cost makes this solution infeasible for any database of significant size.

Another approach is to use exponentiation. For example, the server may represent the database as an integer exponent E. Depending on the size of the database, E may be quite large (e.g., thousands or millions of digits). The client obtains a group G that is represented by a modulus M associated with a data block (e.g., query element stored) on the untrusted server. The client may select a group element g, where g is associated with the data block (e.g., query element) stored on the server that the client wants to download. The client desires to solve $g^E$ mod M, as the client can use the result to obviously retrieve the selected data block. The client knows the prime factorization of M, but desires to keep the prime factorization secret.

In this situation, the client could merely send g and M to the server and allow the server to compute $g^E$ mod M. However, as previously discussed, exponentiation is a super-linear problem and with a sufficient size of the exponent E (i.e., the size of the database), the computation requirements are prohibitive. The server could greatly simplify the computation with knowledge of the prime factors of the modulus (e.g., by using Fermat's Little Theorem), but the client desires to keep the prime factors secret. Thus, it is advantageous for the client to perform efficient computation using the prime factorization and then outsource the remaining exponentiation to the server to both avoid the bandwidth costs of transmitting the entire database (i.e., the exponent) and the computation cost of the server performing the full exponentiation without access to the prime factorization of the modulus.

Implementations herein are directed toward a routine for outsourcing exponentiation in a private group without revealing the prime factorization of a modulus. The routine allows for a practical balance between bandwidth and computation by having a client perform efficient exponentiation using a secret prime factorization of a modulus to generate a series of base values without the use of a sever-held exponent. The client sends the series of base values to the server for further computation with the server-held exponent without providing the prime factorization.

Referring to FIG. 1, in some implementations, an example system 100 includes a user device 10 (also referred to as a client device 10) associated with a respective user or client 12 and in communication with a remote system 111 (herein also referred to as a server or as an untrusted server) via a network 112. The user device 10 may correspond to any computing device, such as a desktop workstation, a laptop workstation, or a mobile device (i.e., a smart phone). The remote system 111 may be a single computer, multiple computers, or a distributed system (e.g., a cloud environment) having scalable/elastic computing resources 118 (e.g., data processing hardware) and/or storage resources 116 (e.g., memory hardware). An untrusted data store 150 (e.g., 'untrusted storage device' or 'untrusted server') is overlain on the storage resources 116 to allow scalable use of the storage resources 116 by one or more of the client or computing resources 118. The untrusted data store 150 is configured to store a plurality of data blocks 152, 152a-n available for download by the client device 10. For example, the untrusted data store 150 includes publically-known and un-encrypted n data blocks (B) 152 and allows one or more client devices 10 to use PIR for obliviously retrieving data blocks (B) 152 to conceal access patterns while preserving search functionalities on the data blocks (B) 152 by the client devices 10. Thus, the client device 10 may not own the data blocks 152 and the content of the data blocks 152 are available to the public in some configurations. Alternatively, the data blocks 152 may be private to a specific client 12, but the client 12 still desires to conceal access patterns from the untrusted data store 150. The data blocks 152 may be represented by an integer. That is, the untrusted data store 150 or the server 111 may process each data block 152 to generate a single integer that is representative of all of the data blocks 152. For example, the server 111 may use the Chinese Remainder Theorem to encode each data block 152 with a distinct small prime.

The client device 10 (e.g., a computer) associated with the client 12 may include associated memory hardware 122 and associated data processing hardware 124. Each client device 10 may leverage the associated memory hardware 122 to hold or store a query instruction 130, a group (G) 132 represented by a modulus (M) 134, a positional base (B) 136, and a positional count (m) 138. In some examples, the data processing hardware 124 executes a generator 160 for generating a series of base values 162 issued to the remote system 111, which herein may also be referred to as a server executing in an untrusted environment.

The generator 160, in some examples, executes the query instruction 130 to retrieve a query element (i.e., a data block (B) 152) stored on the untrusted data store 150. To this end, the generator 160 obtains or receives or generates the modulus (M) 134 associated with the query element 150 stored on the untrusted data store 150. The modulus 134 is a product of two or more prime numbers 135. The prime numbers 135 are selected by the user device 10 and may form the basis of a private key. Thus, the primes 135 remain secret from all other parties (including the server 111). The generator 160 also obtains or receives or generates a group (G) 132 that includes one or more group elements (g) 133. The group 132 is represented by the modulus 134 and each group element 133 of the group 132 is a generator of a subgroup of the prime number 135.

Figure 2:
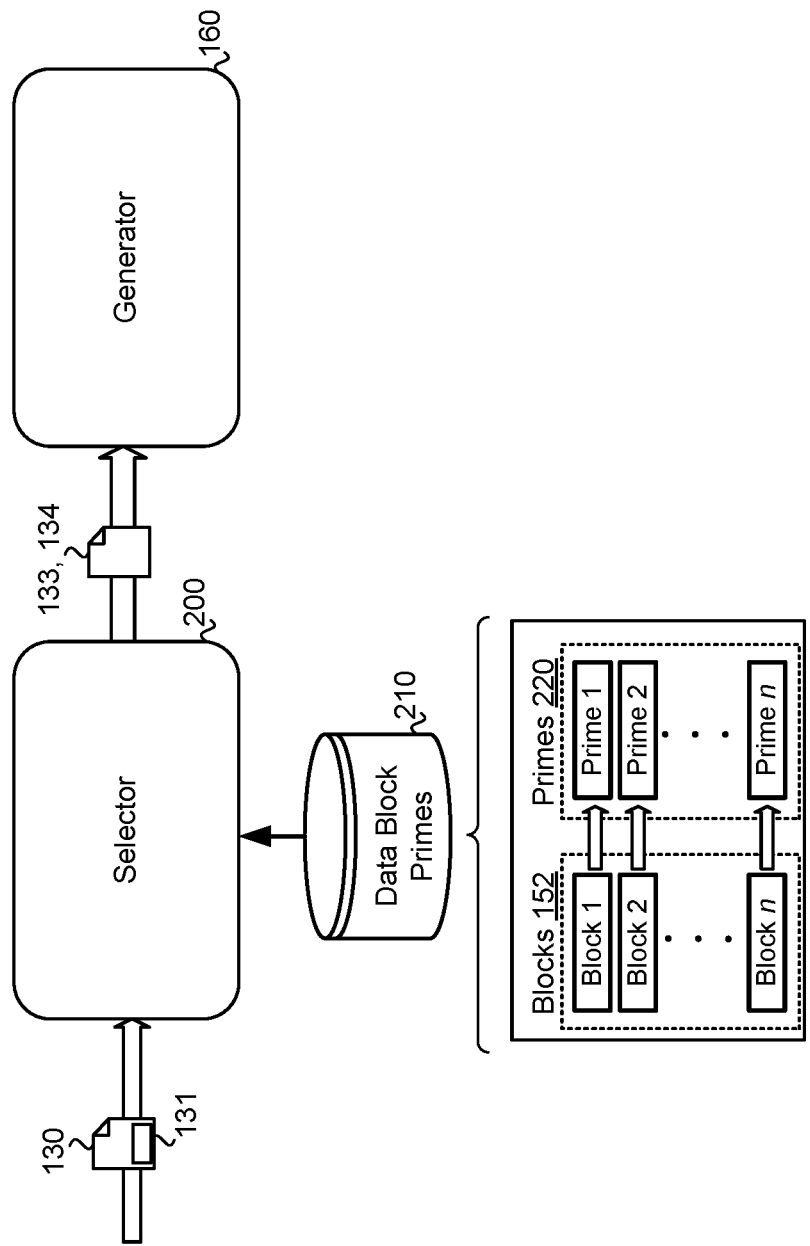
FIG. 2 is a schematic view of an exemplary selector of the system of FIG. 1.

Referring now to FIG. 2, in some implementations, the data processing hardware 122 executes a selector 200 that receives the query instructions 130. The query instructions 130 include one or more data block selections 131. Each data block selection 131 corresponds to a data block 152 (e.g., query element) to be retrieved obliviously from the untrusted data store 150. The selector 200 is in communication with a data block primes data store 210 stored at the server 111 (e.g., at memory hardware 116). The data block primes data store 210, in some examples, stores a respective data block prime 220 associated with each data block 152 stored on the untrusted data store 150. That is, the data block prime store 210 may provide the data block prime 220 that corresponds to the data block 152 to be retrieved from the data store 150. The selector 200 may use the data block selections 131 from the query instructions 130 to obtain the data block primes 220 corresponding to the data blocks 152 associated with the data block selections 131. Using the obtained data block primes 220, the selector 200 selects a prime factorization of the modulus 134. The prime factorization includes two or more prime numbers 135 and at least one of the prime numbers 135 corresponds to the data block prime 220. Similarly, the group element 133 is selected based on the data block selections 131 such that both the modulus 134 and the group element 133 are associated with the data block prime 220 associated with the data block 152 to be retrieved from the untrusted data store 150. That is, the group element 133 is configured to generate a respective one of the prime numbers 135 of the prime factorization of the modulus M 134.

Referring back to FIG. 1, the generator 160, in some implementations, also receives or determines the positional base (B) 136. The positional base 136 is the base (also called the radix) of a server-held exponent 154. That is, the exponent 154 may be represented with any base greater than or equal to two (i.e., binary), and the positional base 136 is selected by the client device 10 or the server 111 to represent the exponent 154. The positional base 136, in some examples, is selected by the user 12, while in other examples the user device 10 automatically determines the positional base 136. In additional examples, the server determines and relays the positional base 136 to the client device 10. In addition to the positional base 136, the generator 160 may receive a positional count (m) 138. As described in more detail below, the positional count 138 represents a number of digits 212 (FIG. 3) required to represent the exponent 154 with the positional base 136.

Figure 3:
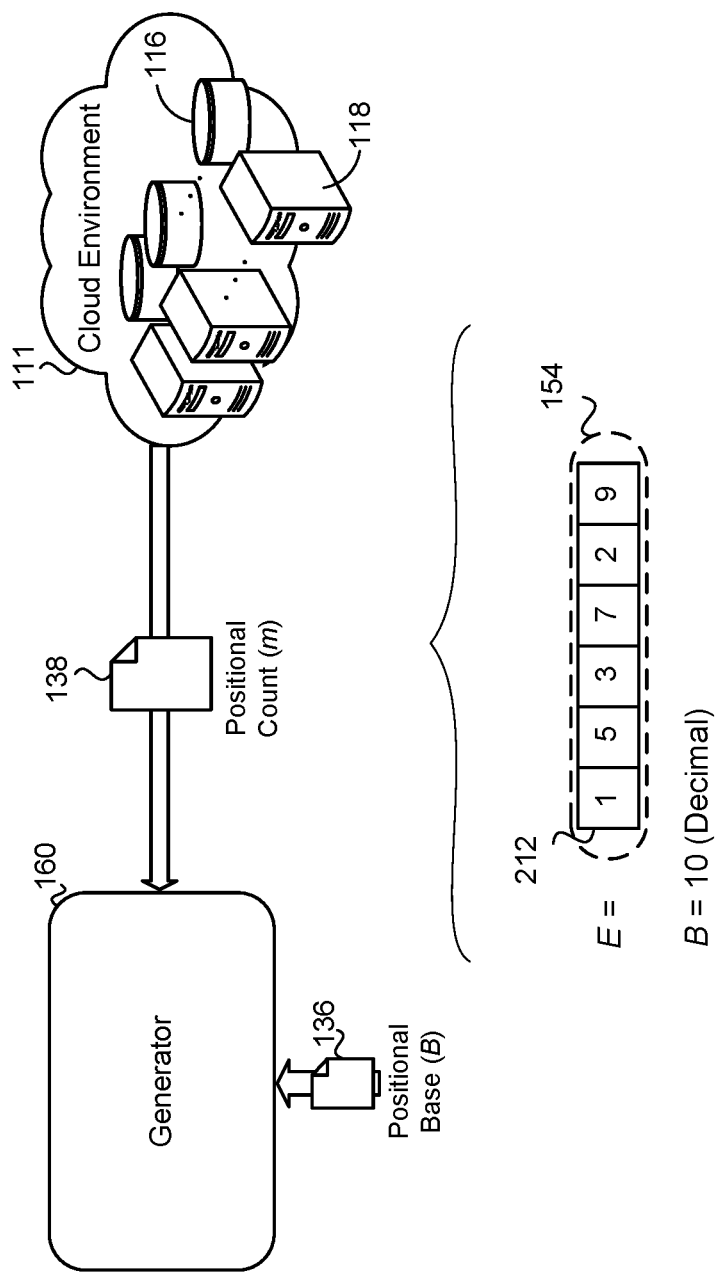
FIG. 3 is a schematic view of components of the system of FIG. 1 and an exemplary positional numeral system.

The generator 160, using the prime factors 135, generates a series of base values 162, 162a—n. Each base value 162, in some examples, is an exponentiation of the group element 133 by the positional base 136, which corresponds to a value of a digit position in a positional numeral system. Referring now to FIG. 3, an exemplary exponent 154 is equal to 153,729 when the positional base 136 is equal to ten (i.e., using a decimal positional numeral system). It is understood that any positional numeral system (i.e., the positional base 136) may be selected. For example, the numeral position system may include binary, hexadecimal, or decimal. While typically the exponent 154 is extremely large, small numbers are used in the example for clarity. The server 111, which interprets the exponent 154 with the selected positional base 136 (in this case, ten), determines the positional count 138. That is, the server 111 determines the number of digits 212 required to represent the exponent 154 with the positional base 136. In the example shown, the exponent 154 (i.e., 153,729) can be represented in decimal (i.e., b=10) with six digits 212. Thus, the positional count 138 is equivalent to six (in decimal). Regardless of the selected positional base 136, the exponent may be represented as:

$$E = E_0 + E_1 B_1 + E_2 E_2 + \ldots + E_m B_m \qquad (1)$$

Figure 4:
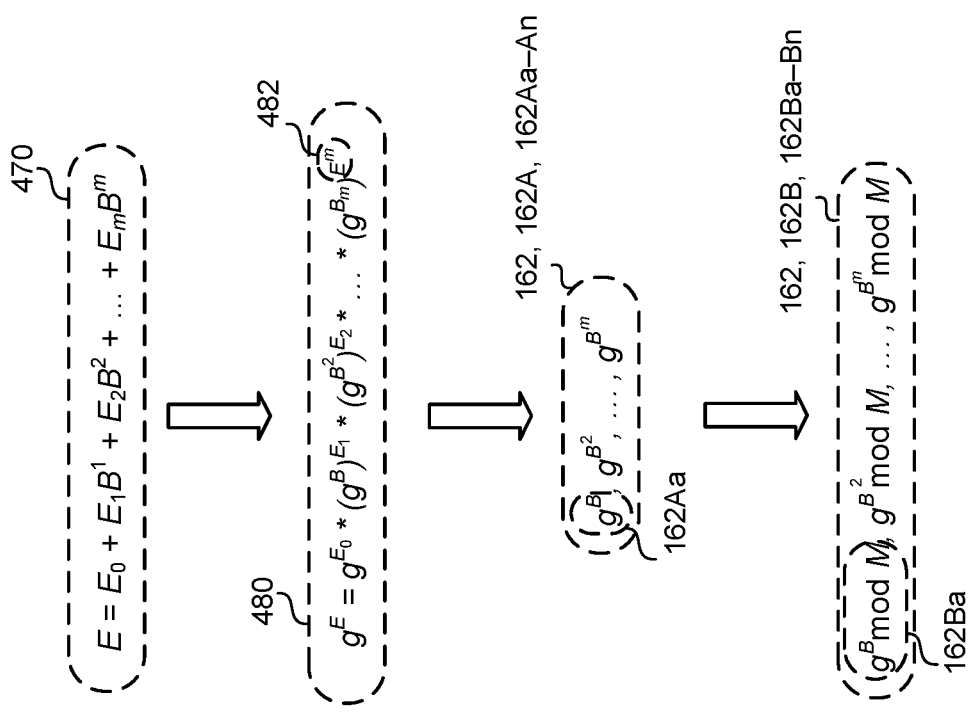
FIG. 4 is a flowchart of example operations to generate a series of base values.

Here the exponent 154, in decimal (i.e., the positional base is equal to ten), is represented as 9+(2*10)+(7*100)+(3*1000)+(5*10000)+(1*100000) for a total of 153,729. Referring now to FIG. 4, equation (1) 470 allows for $g^E$ to be rewritten as:

$$g^E = g^{E_0} * (g^B)^{E_1} * (g^{B^2})^{E_2} * \ldots * (g^{B^m})^{E_m} \qquad (2)$$

As is apparent from equation (2) 480, a portion of $g^E$ may be calculated without the server-held exponent 154. That is, the generator 160 may generate the series of base values 162 as the series:

$$g^B, g^{B^2}, \ldots, g^{B^m} \qquad (3)$$

It is clear that the selected positional base 136 affects the number of base values 162 in the series of base values 162a-n (i.e., the variable m), and thus, the positional base 136 directly affects the communication cost of transmitting the series of base values 162. Because larger positional bases 136 require more difficult computations, selection of the positional base 136 directly provides the tradeoff between communication cost and computation cost. In some examples, the positional base 136 (i.e., the numeral position system) is selected by the client device 10 or the server 111 based on a bandwidth limit for communications between the client device 10 and the server 111. In other examples, the positional base 136 is selected to be approximately half of the number of digits 212 required to represent the exponent 154 in the selected positional numeral system. For example, a selection may result in an exponent 154 that requires 10,000 digits when represented with a positional base of 5,000.

In some implementations, the server 111 transmits the positional count 138 of the exponent 154 to the generator 160. The generator 160 may use the positional count 138 to determine a number of base values 162 to generate. In the example shown, the generator 160 may generate six base values 162 because the value 153,729 is represented with six digits 212. Because the generator 160 has access to the prime factors 135, the generator 160 generates the series of base values 162 efficiently without use of the server-held exponent 154 (e.g., using Fermat's Little Theorem or other techniques such as Euler's Theorem, Carmichael's Theorem, or the Chinese Remainder Theorem). The generator 160 may transmit the series of base values 162 to the server 111.

In some implementations, the series of base values 162 represents a series of initial base values 162A, 162Aa-An. That is, in some examples, the generator 160 generates a series of initial base values 162A using the prime factorization of the modulus 134 and the group element 133. The generator 160 may reduce each initial base value 162A by the modulus 134 (i.e., by modulo M) to generate a series of modulus-reduced base values 162B, 162Ba-Bn. Thus, each modulus-reduced base value 162B includes a respective initial base value 162A in the series of initial base values 162A reduced by the modulus 134. In lieu of the series of initial base values 162A, the generator 160 may transmit the series of modulus-reduced base values 162B to the untrusted server 111. That is the series of base values 162 sent to the server 111 either include the series of initial base values 162A or the series of modulus-reduced base values 162B. Reducing the initial base values 162A by modulo M significantly reduces the size of the base values 162B sent to the server 11 and therefore significantly reduces the bandwidth required to transmit the series of base values 162B to the server 111. Because modulus operations are computationally easier than exponentiation, performing the extra modulus operations may be advantageous.

Referring back to FIG. 1, in some implementations, the server 111 executes an exponent multiplier 170. The exponent multiplier 170 receives the series of base values 162 from the client device 10 (e.g., the generator 160) and receives the exponent 154 from the untrusted data store 150. Optionally, the client device 10 may also provide the group element 133 and/or the modulus 134 to server 111 for use by the exponent multiplier 170 in generating a result 192. In some examples, the exponent multiplier 170 (or another module executing on the server 111) determines the exponent 154 from the data blocks 152 of the untrusted data store 150. The exponent multiplier 170 uses the client-generated series of base values 162 and the exponent 154 to compute $g^E$. In some examples, the server 111 determines the exponentiation of the group element 133 with the exponent 154 stored on the untrusted server 111 by determining, for each base value 162 in the series of base values 162, an exponentiation of the base value 162 with a value 482 (FIG. 4) at a respective digit position of the exponent 154 and multiplying the exponentiations of the base values 162 with the values 482 at the respective digit positions of the exponent 154 together to generate a result 192. The result 192 is associated with the queried element (i.e., the data block 152 selected by the data block selection 131).

Because the server 111 may now generalize this computation into a standard problem of multiplying m bases with m exponents, the server 111 may utilize a number of algorithms to efficiently determine the result 192. For example, the server 111 may use Pippenger's exponentiation algorithm or other addition-chain exponentiation methods.

After determining $g^E$, the server 111 may send $g^E$ as the result 192 back to the user device 10. Alternatively, the server 111 may reduce $g^E$ by modulo M (i.e., the modulus 134) to generate the result 192, as this will significantly reduce the size of the result 192 and, as previously discussed, modulus operations are computationally easier than exponentiation. The result 192 is based on the exponentiation of the group element 133 with the exponent 154 stored on the untrusted data store 150. That is, the result 192 corresponds to the value of the data block 152 selected by the data block selection 131.

The system 100 offers significantly reduced bandwidth usage over sending the entire exponent 154 to the client device 10, as the system only transmits m exponents, each of which may be represented with log(M) bits. The modulus 134 (M) is typically much smaller than the exponent 154, m*log(M)<E. Additionally, the system 100 offers significantly reduced computation over the server fully computing the exponentiation of the group element 133 because the user device 10 takes advantage of the knowing the prime factorization of the modulus 134 that is never revealed to the untrusted server 111 or the untrusted data store 150. Thus, the system, by splitting a large problem (i.e., exponentiation with very large exponents) into several smaller problems (i.e., the smaller base value 162 exponents), the system 100 reduces the overall cost (both asymptotic and concrete) of computation without the client device 10 ever revealing the prime factorization of the modulus 134 to the untrusted server 111. The system 100 provides a balance between the cost of communication (e.g., bandwidth) and computation and allows both the user device 10 and the server 111 to efficiently compute. For example, the system 100 may improve over more naive approaches (e.g., transmitting the full exponent 154 or allowing the server to fully compute $g^E$), using standard costs of computation and communication, between 10× to 100×. While the examples herein are directed towards PIR, the described methods for outsourcing exponentiation may be advantageous in many other fields (e.g., blockchains).

Figure 5:
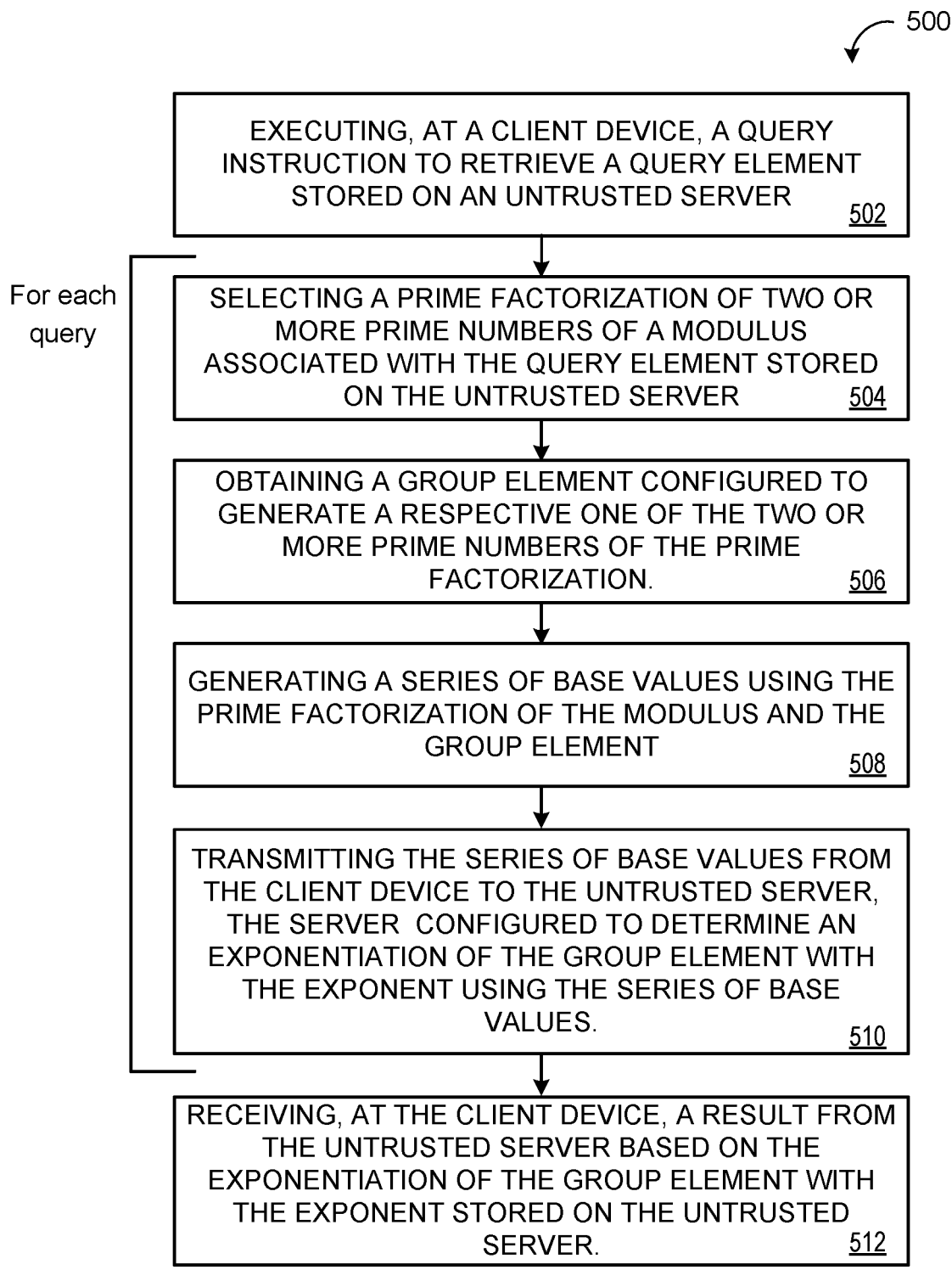
FIG. 5 is a flowchart of an example arrangement of operations for a method of outsourcing exponentiation in a private group.

FIG. 5 is a flowchart of an example method 500 for outsourcing exponentiation of a private group. The method 500 starts at operation 502 with executing, at data processing hardware 122 of a client device 10, a query instruction 130 to retrieve a query element 152 stored on an untrusted server 111, 150 by, at operation 504, selecting a prime factorization of a modulus 134 associated with the query element 152 stored on the untrusted server 111, 150. The prime factorization includes two or more prime numbers 135. At operation 506, the method 500 includes obtaining a group element 133 configured to generate a respective one of the two or more prime numbers 135 of the prime factorization. At operation 508, the method 500 includes generating a series of base values 162 using the prime factorization of the modulus 134 and the group element 133, and, at operation 510, transmitting the series of base values 162 from the client device 10 to the untrusted server 111, 150. The untrusted server 111, 150 is configured to determine an exponentiation of the group element 133 with an exponent 154 stored on the untrusted server using the series of base values 162. At operation 512, the method 500 includes receiving, at the data processing hardware 122, a result 192 from the untrusted server 111, 150. The result 192 is based on the exponentiation of the group element 133 with the exponent 154 stored on the untrusted server 111. 150.

Figure 6:
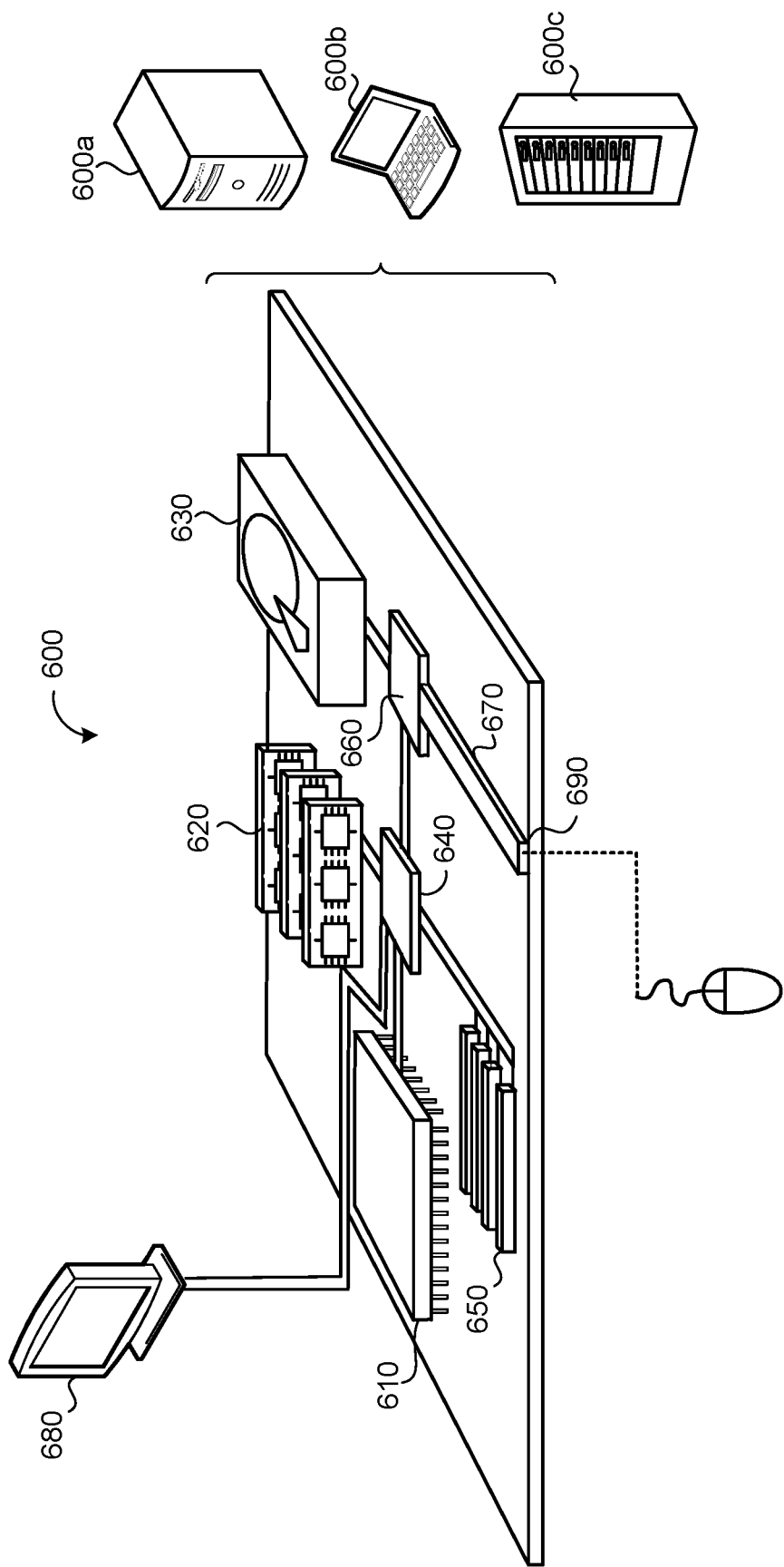
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a server causes the data processing hardware to perform operations comprising:
   obtaining a positional base indicative of a numeral position system;
   determining a server-held exponent based on the positional base, the server-held exponent representative of a plurality of data blocks stored on memory hardware in communication with the data processing hardware;
   determining a positional count of the server-held exponent, the positional count indicative of a number of digits of the server-held exponent using the numeral position system indicated by the positional base;
   transmitting the positional count to a client device;
   receiving, from the client device, a series of base values, the series of base values based on the positional count, a group element representative of one of the plurality of data blocks and a bandwidth limit for communications between the client device and the server;
   determining, using the series of base values and the server-held exponent, a result associated with the one of the plurality of data blocks without revealing an identity of the one of the plurality of data blocks to the server; and
   transmitting the result to the client device.

2. The method of claim 1, wherein determining the result comprises determining an exponentiation of the group element with the server-held exponent using the series of base values.

3. The method of claim 2, wherein determining the result further comprises reducing the exponentiation of the group element with the server-held exponent by a modulus, the group element associated with a prime factorization of the modulus.

4. The method of claim 3, wherein the client device never reveals the prime factorization of the modulus to the server.

5. The method of claim 2, wherein determining the exponentiation of the group element comprises:
for each base value in the series of base values received from the client device, determining an exponentiation of the base value with a value at a respective digit position of the server-held exponent; and
multiplying the exponentiations of the base values with the values at the respective digit positions of the server-held exponent together.

6. The method of claim 1, wherein the positional base is based on a bandwidth limit for communications between the client device and the server.

7. The method of claim 1, wherein the series of base values are based on an exponentiation of the group element by a respective base element corresponding to a digit position in the numeral position system.

8. The method of claim 1, wherein the numeral position system comprises one of binary, hexadecimal, or decimal.

9. The method of claim 1, wherein determining the server-held exponent comprises encoding each data block with a unique prime based on the Chinese Remainder Theorem.

10. The method of claim 1, wherein obtaining the positional base comprises receiving the positional base from the client device.

11. A system comprising:
data processing hardware of a server; and
memory hardware in communication with the data processing hardware, the memory hardware storing instructions that when executed on the data processing hardware cause the data processing hardware to perform operations comprising:
obtaining a positional base indicative of a numeral position system;
determining a server-held exponent based on the positional base, the server-held exponent representative of a plurality of data blocks stored on the memory hardware;
determining a positional count of the server-held exponent, the positional count indicative of a number of digits of the server-held exponent using the numeral position system indicated by the positional base;
transmitting the positional count to a client device;
receiving, from the client device, a series of base values, the series of base values based on the positional count, a group element representative of one of the plurality of data blocks, and a bandwidth limit for communications between the client device and the server;
determining, using the series of base values and the server-held exponent, a result associated with the one of the plurality of data blocks without revealing an identity of the one of the plurality of data blocks to the server; and
transmitting the result to the client device.

12. The system of claim 11, wherein determining the result comprises determining an exponentiation of the group element with the server-held exponent using the series of base values.

13. The system of claim 12, wherein determining the result further comprises reducing the exponentiation of the group element with the server-held exponent by a modulus, the group element associated with a prime factorization of the modulus.

14. The system of claim 13, wherein the client device never reveals the prime factorization of the modulus to the server.

15. The system of claim 12, wherein determining the exponentiation of the group element comprises:
for each base value in the series of base values received from the client device, determining an exponentiation of the base value with a value at a respective digit position of the server-held exponent; and
multiplying the exponentiations of the base values with the values at the respective digit positions of the server-held exponent together.

16. The system of claim 11, wherein the positional base is based on a bandwidth limit for communications between the client device and the server.

17. The system of claim 11, wherein the series of base values are based on an exponentiation of the group element by a respective base element corresponding to a digit position in the numeral position system.

18. The system of claim 11, wherein the numeral position system comprises one of binary, hexadecimal, or decimal.

19. The system of claim 11, wherein determining the server-held exponent comprises encoding each data block with a unique prime based on the Chinese Remainder Theorem.

20. The system of claim 11, wherein obtaining the positional base comprises receiving the positional base from the client device.

* * * * *